US007217927B2

(12) United States Patent
Worstell

(10) Patent No.: US 7,217,927 B2
(45) Date of Patent: May 15, 2007

(54) DIVERSITY PROCESSING OF COINCIDENCE DATA

(75) Inventor: William A. Worstell, Wayland, MA (US)

(73) Assignee: PhotoDetection Systems, Inc., Acton, MA (US)

(*) Notice: Subject to any disclaimer, the term of this patent is extended or adjusted under 35 U.S.C. 154(b) by 187 days.

(21) Appl. No.: 10/971,745

(22) Filed: Oct. 22, 2004

(65) Prior Publication Data

US 2006/0086904 A1    Apr. 27, 2006

(51) Int. Cl.
G01T 1/172    (2006.01)
(52) U.S. Cl. .............................. 250/363.04; 250/363.03
(58) Field of Classification Search ........... 250/363.03, 250/363.04
See application file for complete search history.

(56) References Cited

U.S. PATENT DOCUMENTS

| 5,793,045 | A |   | 8/1998 | DiFilippo et al. |  |
| 6,294,788 | B1 | * | 9/2001 | Cooke et al. | 250/363.03 |
| 2003/0004405 | A1 |   | 1/2003 | Townsend et al. | 600/407 |
| 2004/0120565 | A1 |   | 6/2004 | Wollenweber | 382/131 |
| 2004/0258286 | A1 | * | 12/2004 | Salla et al. | 382/128 |

OTHER PUBLICATIONS

Rohatgi, et al., "Diversity Combining Signal Processing and NEC in List Mode PET," 2004 IEEE Nuclear Science Symposium and Medical Imaging Conference, Rome, Italy, Oct. 16-22, 2004.
Beaulieu, Norman C., "Introduction to 'Linear Diversity Combining Techniques'", Proceedings of the IEEE, vol. 91, No. 2, Feb. 2003, pp. 328-330.
Brennan, D. G., "Linear Diversity Combining Techniques", Proceedings of the IEEE, vol. 91, No. 2, Feb. 2003, pp. 331-356.
Chen et al., "A Fast, Energy-Dependent Scatter Reduction Method for 3D PET Imaging", Proceedings of the 2003 IEEE Nuclear Science Symposium and Medical Imaging Conference, Oct. 19-25, 2003, Portland, Oregon, M10-241, 5 pages.
Manavaki et al., "Scatter Modeling for 3-D PET List-Mode EM Reconstruction", Conference record of the 2002 IEEE, Medical Imaging Conference, Norfolk, Virginia, 6 pages.
Rahmim et al., "Weighted Iterative List-Mode Reconstruction for the High Resolution Research Tomograph", Med. Biol., vol. 43, 1998, pp. 835-846.

* cited by examiner

Primary Examiner—David Porta
Assistant Examiner—Djura Malevic
(74) Attorney, Agent, or Firm—Fish & Richardson P.C.

(57) ABSTRACT

In a PET scanner, a method for processing coincidence data includes associating a selected portion of the coincidence data with one of a plurality of subspaces of a coincidence space; deriving, from the coincidence data associated with subspace, a contribution to be used in forming an image; and weighting the contribution by an amount that depends on a likelihood that the coincidence data associated with that subspace includes data indicative of trues.

13 Claims, 2 Drawing Sheets

DIVERSITY PROCESSING OF COINCIDENCE DATA

FIELD OF INVENTION

The invention relates to PET scanners, and in particular to processing coincidence data from a PET scanner.

BACKGROUND

A PET scanner includes a ring of detectors for detecting gamma-rays. For each pair of events detected by diametrically opposed detectors, these exists a probability that those events arose from a pair of gamma-rays received directly from within a patient. However, there also exists a probability that at least one of the received gamma-rays was scattered on its way to the detector, or that the gamma-rays did not even arise from the same annihilation event.

In rendering an image, the latter two types of event pairs contribute to noise. It is therefore desirable to suppress such noise when generating the image.

SUMMARY

In one aspect, the invention includes a method for processing coincidence data in which a selected portion of the coincidence data is associated with one of a plurality of subspaces of a coincidence space. From the coincidence data associated with a subspace, one derives a contribution to be used in forming an image. This contribution is then weighted by an amount that depends on a likelihood that the coincidence data associated with that subspace includes data indicative of trues.

In some embodiments, the coincidence space includes selected attributes of events that constitute coincidences. Exemplary attributes include spatial locations of the events, times of occurrence of the events, energies associated with the events, temporal distribution of photons indicative of an event, spatial distribution of photons indicative of an event, and energy distribution of photons indicative of an event.

Other embodiments include determining, on the basis of the selected attributes, a probability that coincidences in a particular subspace are trues.

Yet other embodiments are those in which weighting the contribution includes estimating a mean of a trues probability density. An exemplary way to do so includes determining a spatially-dependent error function associated with spatial locations of events and a spatially-independent error function; and convolving the spatially-dependent error function and the spatially-independent error function.

In another aspect, the invention includes a PET scanner configured to carry out any of the foregoing methods. Yet another aspect of the invention includes a computer-readable medium having encoded thereof software for carrying out any of the foregoing methods.

These and other features of the invention will be apparent from the following description and the accompanying figures, in which:

DETAILED DESCRIPTION

Figure 1:
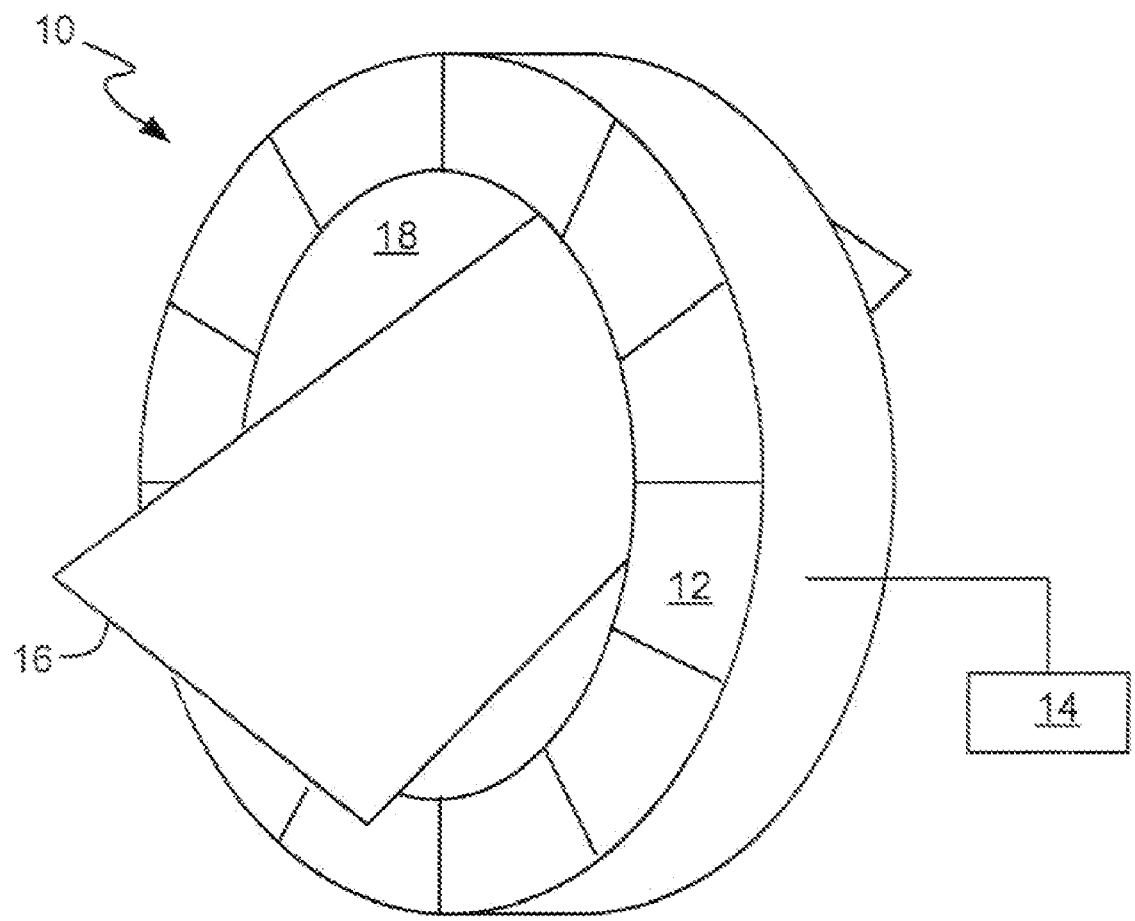
FIG. 1 is a schematic diagram of a PET scanner.

Referring to FIG. 1, a PET ("position emission tomography") scanner 10 includes a ring of detectors 12 each of which is connected to an image processing system 14. A gantry 16, on which the patient lies, extends through a hole 18 defined by the ring of detectors 12. An exemplary PET scanner is that described in published U.S. application Ser. No. 10/190,741, the contents of which are herein incorporated by reference.

To form an image, one injects a radioactive tracer into the patient. As the radioactive tracer decays, it emits positrons. When a positron encounters an electron within the patient, the two annihilate. The energy released during the annihilation is divided equally between two gamma-ray photons that travel in opposite directions away from the annihilation site.

Each detector 12 includes a scintillation crystal (not shown) having an inner face that faces the patient and an outer face that faces a photodetector (not shown). When a gamma-ray photon travels through the crystal, it causes the emission of visible light photons within the crystal. This interaction is referred to as an "event."

The visible-light photons eventually reach the photodetector, which provides, to the image processing system 14, information indicative of the location of the event, the time at which it occurred, and the energy associated with the gamma-ray photon that caused the event.

When two events occur on diametrically opposed detectors 12 at approximately the same time, it is quite possible that those two events arose from a pair of gamma ray photons that originated from the same annihilation. Such a pair of events will be referred to as a "coincidence."

Each coincidence is characterized by seven quantities: two coordinates specifying the location of a first event, two coordinates specifying the location of a second event, the energies associated with the first and second events, and the time difference between the occurrence of the first event and the occurrence of the second event. Each coincidence can thus be viewed as occupying a point in a seven-dimensional "coincidence space."

There are three types of coincidences. First, there are true coincidences, or "trues." These result from a pair of gamma ray photons that originated from the same annihilation within the patient, and that reached the detectors 12 directly from the point at which the annihilation occurred (the "annihilation site"). Next, there are the scatter coincidences, or "scatters." Like the trues, the photons from a scatter originate from the same annihilation within the patient. The difference between scatters and trues is that in the former, one of the gamma ray photons was scattered on its way from the annihilation site to the photodetector. Finally, there are random coincidences, or "randoms." These are coincidences in which the events making up the coincidence come from different annihilations altogether.

The seven coordinates that define an event pair in the coincidence space collectively provide some indication of whether a particular coincidence is a true, a scatter, or a random. For example, a true is characterized by gamma-rays that arrived at almost exactly the same time and with the same energies (511 keV each). Scatters are characterized by one or both of the gamma-ray photons having reduced energy. This is because the scattering gamma ray photon gives up a significant fraction of its energy as a result of the scattering event, with the amount of energy loss being related to the scattering angle by the well-known Compton formula.

When constructing an image, the image processing system 14 of the PET scanner 10 makes use of contributions from each pair of diametrically opposed detectors 12. The contribution from a given pair of detectors 12 is obtained by combining selected coincidences detected by that pair of detectors 12 during a measurement interval. Preferably, the selected coincidences include only trues and exclude scatters and randoms.

In practice, it is not possible to know with certainty which coincidences are true and which are scatters or randoms. However, the coordinates that define a coincidence in the seven-dimensional coincidence space provide some indication of the probability that a particular coincidence is a true. The image processing system 14 uses this probability to weight the contribution of each coincidence. Those coincidences that, as result of their location in the seven-dimensional coincidence space, appear more likely to be trues are weighted more heavily. Those that appear less likely to be trues are weighted less heavily.

The coincidence space can include other axes. For example, in some cases the number of photons generated by an event, when plotted over time, shows more than one peak. When this is the case, the time at which the event actually occurred is subject to greater uncertainty than it would have been had there only been one peak. Events classified as trues can thus be weighted in a manner consistent with the temporal distribution of photons resulting from that event. A true characterized by a unimodal distribution would then be weighted more heavily than a true characterized by a bimodal distribution. As the peaks of a bimodal distribution becomes further apart, the weight assigned to a true becomes smaller, until it becomes more likely that the distribution of photons arose from two events rather than a single event. In this case, an additional coincidence space axis is one that measures how bimodal a temporal photon distribution is.

Similarly, a spatially bimodal photon distribution within a scintillator block is indicative of a gamma ray that has undergone Compton scattering within the scintillator block. A true characterized by a spatially bimodal or multimodal photon distribution is thus less likely to be reliable than a true characterized by a spatially unimodal photon distribution. In this case, an additional coincidence space axis provides a measure of how spatially bimodal a photon distribution is.

The image processing system 14 thus makes use of all available information in the ensemble of coincidences detected during a measurement interval. This is an improvement over systems in which information associated with a coincidence is discarded if the probability that the coincidence is a true is even slightly under an arbitrarily chosen threshold. It is also an improvement over those image processing systems in which information associated with all coincidences deemed likely to be trues is weighted equally, regardless of how likely it is that those coincidences are indeed trues.

Figure 2:
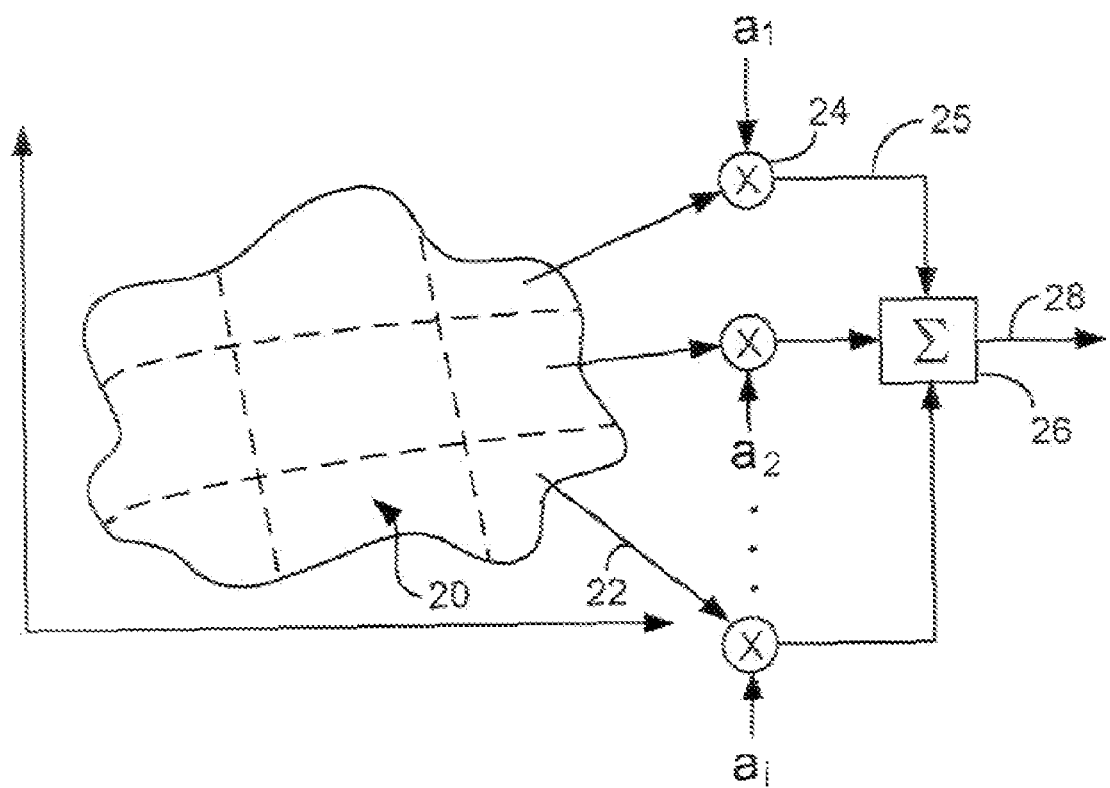
FIG. 2 is a block diagram showing the weighting of coincidence data segmented by subspaces of a coincidence space.

Referring now to FIG. 2, for each detector pair, the image processing system 14 can be viewed as partitioning the seven-dimensional coincidence space into a set of subspaces 20, each of which corresponds to a particular channel 22. The coincidences falling within a particular subspace 20 of the coincidence space are assigned to whichever channel 22 is associated with that subspace.

Coincidences that fall within a channel 22 are weighted at a mixer 24 by a channel-weight associated with that channel. The weighted coincidences 25 are then summed together at a summation unit 26 to yield a contribution 28 associated with that pair of detectors.

Preferably, the subspaces 20 are disjoint to avoid double-counting of coincidences. However, double-counting a coincidence can be viewed as an indirect way to assign a greater weight to that coincidence. The image processing system 14 can thus be configured to define overlapping subspaces.

The weights are selected such that the weighted sum 28 has the highest possible signal-to-noise ratio. Techniques for selecting the weights are known from D. G. Brennan, "Linear Diversity Combining Techniques," Proc. IRE, vol. 47, June 1959, pp. 1075–1102 and N. C. Beaulieu, "Introduction to Linear Diversity Combining Techniques," Proc. IEEE, vol. 91, no. 2, February 2003, the contents of which are herein incorporated by reference.

In an image processing system 14 according to the invention, the contribution of coincidence data from a particular channel 22 is weighted by the conditional probability that a coincidence characterized by the coordinates associated with that channel is a true. In particular, the weight is given by the ratio:

$$\frac{T}{T+S+R}$$

where T is the mean of the density function for the event that a coincidence characterized by the channel's coordinates is a true, S is the mean of the density function for the event that a coincidence characterized by the channel's coordinates is a scatter, and T is the mean of the density function for the event that a coincidence characterized by that channel's coordinates is a random. The denominator (T+S+R) is often referred to as the mean P of the prompts density function. The measured mean of the prompts density function is hereafter referred to as P'.

The means T, S, and R are the means of the actual density functions, and not the means T', S', and R' of measured distributions as obtained from a finite number of samples. The image processing system 14 therefore executes methods for estimating the actual means, T, S, and R (hereafter referred to as the "trues model", "scatter model", and "randoms model", respectively) from the measured means T', S', and R'.

To determine T' and estimate T, it is useful to recognize that if a coincidence is in fact a true, then the energies associated with each gamma-ray photon should be identical, and the gamma-ray photons should arrive at the detectors 12 at the same time. Thus, any error that leads to a measured energy difference or a difference in the measured times of arrival must be due to instrument error alone. These instrument errors are to first order independent of errors in measuring the spatial locations of the two events that constitute the coincidence.

In recognition of this, the trues model T can be viewed as a product of a first factor, which depends only on the measured locations of the events, and a second factor that depends on instrument measurement accuracy:

$$T = T_4(x_1, y_1, x_2, y_2) T_3(E_1, E_2, \Delta t)$$

A variety of ways are known in the prior art for estimating the first factor $T_4$ from P'. These methods include background subtraction and scatter subtraction. The second factor, $T_3$, can readily be determined by instrument calibration.

The denominator, P, can readily be estimated by using the measured samples $P'_7$. However, if desired, $P_7$ can be obtained by determining S and R, and adding them to the previously determined T.

To determine R, it is useful to recognize that for random coincidences, the time differences between the two events that make up the coincidence are, at least to first order, uncorrelated. The model R' is thus separable into three factors:

$$R = R_3(x_1, y_1, E_1) R_3(x_2, y_2, E_2) R_1(\Delta t)$$

The first two factors depend on quantities that are readily measured by the photodetectors. The last factor depends only on a known or readily measured time difference distribution between events making up a random coincidence (i.e., typically a bounded uniform distribution).

To determine S, it is useful to recognize that the distribution from which S' is sampled is a smoothly varying one, both along the spatial axes and along the energy axes of the coincidence space. This is not the case for the distribution from which T' and R' are sampled. A useful method for estimating S is therefore to begin with P, to take away from it the T and R estimated earlier, and then to smooth the result to eliminate the rapid variations arising from the T and R distributions. The smoothing step is of particular importance because without it, the resulting estimate for S would be subject to considerable statistical fluctuation.

To further enhance the accuracy with which S can be determined, it is also useful to recognize that the highest energy scatters, i.e. those corresponding to gamma-ray photons with the smallest scattering angles, should vary along the spatial axes in substantially the same way as the trues. It is therefore useful to perform the smoothing operation subject to this constraint.

Thus, unlike prior art methods that exclude many useful coincidences, the present image processing system 14 uses a wider acceptance criterion for coincidences, weighting each one according to the probability that, given its attributes, the coincidence is a true. In this way, the method described herein uses all available information in a manner that maximizes signal-to-noise for the information ensemble.

Having described the invention, and a preferred embodiment thereof, what is claimed as new, and second by letters patent is.

The invention claimed is:

1. In a PET scanner, a method for processing coincidence data, the method comprising:
    associating a selected portion of the coincidence data with one of a plurality of subspaces of a coincidence space;
    deriving, from the coincidence data associated with a subspace, a contribution to be used in forming an image, the contribution being a function of a temporal dimension, the function having a derivative that includes more than one impulse;
    weighting the contribution by an amount that depends on a likelihood that the coincidence data associated with that subspace includes data indicative of and trues; and
    forming an image at least in part on the basis of the weighted contribution.

2. The method of claim 1, further comprising defining the coincidence space to include selected attributes of events that constitute coincidences.

3. The method of claim 2, further comprising selecting the attributes to include spatial locations of the events.

4. The method of clainm 2, further comprising selecting the attributes to include times of occurrence of the events.

5. The method of claim 2, further comprising selecting the attributes to include energies associated with the events.

6. The method of claim 2, further comprising selecting the attributes to include a temporal distribution of photons indicative of an event.

7. The method of claim 2, further comprising selecting the attributes to include a spatial distribution of photons indicative of an event.

8. The method of claim 2, further comprising selecting the attributes to include an energy distribution of photons indicative of an event.

9. The method of claim 1, wherein weighting the contribution comprises determining, on the basis of the selected attributes, a probability that coincidences in a particular subspace are trues.

10. The method of claim 1, wherein weighting the contribution comprises estimating a mean of a trues probability density.

11. The method of claim 10, wherein estimating the mean of a trues probability comprises;
    determining a spatially-dependent error function associated with spatial locations of events;
    determining a spatially-independent error function; and
    convolving the spatially-dependent error function and the spatially-independent error function.

12. A PET scanner having a processor configured to associate a selected portion of the coincidence data with one of a plurality of subspaces of a coincidence space;
    derive, from the coincidence data associated with a subspace, a contribution to be used in forming an image, the contribution being a function of a temporal dimension, the function having a derivative that includes more than one impulse; and
    weight the contribution by an amount that depends on a likelihood that the coincidence data associated with that subspace includes data indicative of trues.

13. A computer-readable medium having encoded thereof software for processing coincidence data, the software including instructions for associating a selected portion of the coincidence data with one of a plurality of subspaces of a coincidence space;
    deriving, from the coincidence data associated with a subspace, a contribution to be used in forming an image, the contribution being a function of a temporal dimension, the function having a derivative that includes more than one impulse;
    weighting the contribution by an amount that depends on a likelihood that the coincidence data associated with that subspace includes data indicative of trues.

* * * * *

UNITED STATES PATENT AND TRADEMARK OFFICE
CERTIFICATE OF CORRECTION

| | |
|---|---|
| PATENT NO. | : 7,217,927 B2 |
| APPLICATION NO. | : 10/971745 |
| DATED | : May 15, 2007 |
| INVENTOR(S) | : William A. Worstell |

It is certified that error appears in the above-identified patent and that said Letters Patent is hereby corrected as shown below:

On the Title page item (56), insert the following after "U.S. PATENT DOCUMENTS"

H12     01/07/86     Bennett et al.

Signed and Sealed this

Eighth Day of July, 2008

JON W. DUDAS
*Director of the United States Patent and Trademark Office*